(12) United States Patent
Meeker et al.

(10) Patent No.: US 9,879,469 B2
(45) Date of Patent: *Jan. 30, 2018

(54) CENTRALLY CONTROLLED SAFE MANAGEMENT SYSTEM

(71) Applicant: FireKing Security Products, LLC, New Albany, IN (US)

(72) Inventors: Scott H. Meeker, Winchester, CA (US); Peter Berens, Fallbrook, CA (US); John G. McDonnell, San Diego, CA (US)

(73) Assignee: FireKing Security Products, LLC, New Albany, IN (US)

( * ) Notice: Subject to any disclaimer, the term of this patent is extended or adjusted under 35 U.S.C. 154(b) by 399 days.

This patent is subject to a terminal disclaimer.

(21) Appl. No.: 14/678,813

(22) Filed: Apr. 3, 2015

(65) Prior Publication Data

US 2015/0211283 A1 Jul. 30, 2015

Related U.S. Application Data

(63) Continuation of application No. 13/248,000, filed on Sep. 28, 2011, now Pat. No. 9,000,916.

(Continued)

(51) Int. Cl.
*E05G 1/10* (2006.01)
*E05G 1/00* (2006.01)
(Continued)

(52) U.S. Cl.
CPC ................ *E05G 1/10* (2013.01); *E05B 47/00* (2013.01); *E05B 65/0075* (2013.01); *E05G 1/00* (2013.01);
(Continued)

(58) Field of Classification Search
CPC .................................. E05G 1/00; G06Q 20/20
See application file for complete search history.

(56) References Cited

U.S. PATENT DOCUMENTS

6,724,303 B2 4/2004 McGunn et al.
6,885,281 B2 4/2005 McGunn et al.
(Continued)

*Primary Examiner* — Talia Crawley
(74) *Attorney, Agent, or Firm* — Great Lakes Intellectual Property, PLLC (57) ABSTRACT

A cash management system utilizes a cloud computing model wherein a cloud of one or more servers may be locally networked or may be geographically dispersed and accessed by the client device over the Internet. The client device is a cash management safe. More than one safe may be employed in a system. Metrics, control functions, and interactions normally handled by an autonomous safe are shunted directly to a cloud server on the network. Usage data, currency validations, coin validations, security entries, etc. are communicated to the cloud server. The cloud server(s), based on database information and software settings, can transmit configuration, updates and information to remote safes. The information transmitted may include user configuration, access rules, currency configuration, alert configuration, and software and firmware updates. The cloud server based cash management system allows the entire cash management of an enterprise to be provided as a service to that enterprise.

19 Claims, 6 Drawing Sheets

Related U.S. Application Data (60) Provisional application No. 61/387,438, filed on Sep. 28, 2010.

(51) Int. Cl.

| | | |
|---|---|---|
| *E05G 7/00* | (2006.01) | |
| *G06Q 20/06* | (2012.01) | |
| *G06Q 20/36* | (2012.01) | |
| *G06Q 30/02* | (2012.01) | |
| *G07D 11/00* | (2006.01) | |
| *G07F 19/00* | (2006.01) | |
| *E05B 47/00* | (2006.01) | |
| *E05B 65/00* | (2006.01) | |
| *E05G 1/02* | (2006.01) | |
| *G06Q 20/20* | (2012.01) | |
| *G07C 9/00* | (2006.01) | |
| *G07F 11/00* | (2006.01) | |

(52) U.S. Cl.
CPC ............. *E05G 1/02* (2013.01); *E05G 7/001* (2013.01); *G06Q 20/0655* (2013.01); *G06Q 20/202* (2013.01); *G06Q 20/3676* (2013.01); *G06Q 30/02* (2013.01); *G07C 9/00563* (2013.01); *G07D 11/0042* (2013.01); *G07D 11/0078* (2013.01); *G07D 11/0081* (2013.01); *G07F 11/002* (2013.01); *G07F 19/202* (2013.01); *G07F 19/209* (2013.01); *E05B 2047/0048* (2013.01); *E05B 2047/0072* (2013.01); *E05G 2700/00* (2013.01)

(56) References Cited

U.S. PATENT DOCUMENTS

| | | | |
|---|---|---|---|
| 6,896,116 B2 * | 5/2005 | Deaville | G07D 11/0003 194/206 |
| 7,063,252 B2 | 6/2006 | Smith et al. | |
| 7,216,098 B1 | 5/2007 | Brooks, Jr. et al. | |
| 7,264,150 B1 * | 9/2007 | Moreland | E05G 7/001 194/206 |
| 7,428,985 B1 | 9/2008 | Moreland et al. | |
| 7,537,153 B2 | 5/2009 | Hurwitz et al. | |
| 7,562,031 B2 | 6/2009 | Brooks, Jr. et al. | |
| 7,576,633 B2 | 8/2009 | McGunn et al. | |
| 7,765,135 B2 | 7/2010 | Hurwitz et al. | |
| 7,850,076 B1 | 12/2010 | Dorenbaum | |
| 2002/0063034 A1 | 5/2002 | Dobbins | |
| 2003/0076228 A1 * | 4/2003 | McGunn | G07C 9/00912 340/541 |
| 2006/0129484 A1 | 6/2006 | Hurwitz et al. | |
| 2006/0253332 A1 | 11/2006 | Dobbins | |
| 2008/0313079 A1 * | 12/2008 | Van Bosch | G06Q 20/20 705/44 |
| 2009/0178598 A1 * | 7/2009 | Meeker | E05G 1/00 109/64 |
| 2011/0011927 A1 | 1/2011 | Dobbins | |

* cited by examiner

CENTRALLY CONTROLLED SAFE MANAGEMENT SYSTEM

RELATED U.S. APPLICATION DATA

This application is a continuing application of U.S. application Ser. No. 13/248,000, filed on Sep. 28, 2011 and published as U.S. Published Application 2012/0073482 A1. Through U.S. application Ser. No. 13/248,000, this application claims priority from U.S. provisional application No. 61/387,438, filed on Sep. 28, 2010. The entire disclosures contained in U.S. provisional application 61/387,438 and U.S. application Ser. No. 13/248,000 including the attachments thereto are incorporated herein by reference.

FIELD OF THE INVENTION

This invention relates generally to a method and apparatus for centrally controlling access to valuable items and specifically currency stored in a remote safe. More specifically, the invention relates to a cloud-based control system for managing safes and other money control systems in commercial settings.

BACKGROUND OF THE INVENTION

Protecting currency in a commercial setting continues to be a crucial and often daunting task, notwithstanding the great strides made in developing security systems over the last 100 years. Electronic cash management systems have largely taken the place of the traditional steel vault or safe, and point-of-sale cash registers have become much more sophisticated as they have become microprocessor controlled. Yet, all great advances in security equipment have been followed by more elaborate thievery schemes such that the commercial world has needed to continually update and improve.

Many standard business practices and policies have been developed to address the problem of retail theft. For instance, businesses typically do not allow large amounts of cash to accrue at any point-of-sale location. Thus, in a given retail store, there is typically a central safe where excess cash from cash registers is deposited for safe-keeping. Some protection is obtained by restricting the employees' access to such safes. Similarly, armored cars are used to transport the cash from stores to the bank. However, since the accounting itself is done manually, there are glaring gaps in the security system. Another problem with safes is that they may be physically removed and there would be little or no evidence of how much cash was stolen.

In a larger business setting, it may be necessary to have a number of different portals where cash is accepted from customers. Safes have also been developed for cash control that include basic cash management features such as the ability to make change or to scan for counterfeit currency. In addition, it is commonly the case that numerous employees have access to cash depositories throughout the day. Accordingly, it is important that a business be able to manage cash access and control such as to reduce thievery and enable accountability to be enhanced among cash-handling employees. This has led to the development of safes that identify the cash deposits and withdrawals and track them according to an individual employee. The capability to identify and verify the identity of employees is essential to accountability.

In business settings involving multiple cash depository stations, the management and oversight of the total collection of data and cash from the stations can be quite a challenge. Prior art systems have been developed to enable multiple cash depository safes to be integrated together, but such systems are often costly and complicated. In addition, the integration of multiple safes can lead to a compromise of security in that should the code or access to part of the system be compromised by, for example, the resignation of a key employee with access information, the entire system may be vulnerable. In this respect, the process whereby one safe serves as a controlling master safe for the group of networked safes could actually undermine the system when access rights are shared or compromised, or software is hacked. Likewise, when one or more of a collection of networked safes utilizes software that is "resident" on the safe or cash access terminal itself, a risk exists that the entire system could be compromised by a physical break-in to a particular safe to access and de-code the resident software.

DESCRIPTION OF THE PRIOR ART

Prior art safe systems have generally taken the approach that one or more central deposit safes will be located throughout the establishment. In large stores, there are several such safes that may be conveniently located throughout the store. In the past, these safes, although computerized, have been largely stand-alone. Their upkeep and maintenance was done manually by on-site personnel. There was an obvious need to coordinate and control the operation of these safes. It was therefore natural to create a local network comprising these safes. This too was achieved with the additional benefit that there could be a central controlling safe that would house the security software, and control the entire network.

For instance, an electronic lock and money control system is disclosed by Smith et al in U.S. Pat. No. 7,063,252. It allows for a single unit standalone operation or a network of multiple units having one unit operate as a centralized network controller. This control unit has a control system that communicates with an input device, a display device, a connector interface and an electronic lock mechanism. It facilitates the monitoring and accumulation of financial and operational information for each remote unit. It also allows for the integration and addition of client units with reduced marginal cost. This invention caters to the needs of a typical large business. However, different businesses will need to be provided with different network systems with different individual control units. It also leaves the responsibility of information retrieval, storage and upgrades largely in the hands of the businesses, thus making it less cost effective. Moreover, this leads to duplication on the part of the business providing the solution, and this added cost of production of individual control units and maintenance of the network and associated software is invariably borne by the client businesses.

Moreland et al discloses an invention in U.S. Pat. No. 7,264,150. This is a computerized drop safe that runs control and security software on a CPU unit. The vault door is remotely controlled, and users have restricted access based on a pre-determined hierarchy developed within the company. Information is retrieved, transmitted and stored remotely over the Ethernet. A unique feature of this invention is that it runs a user-friendly script that allows an end-user employee to generate customized reports without having to write code in some computer language. A similar control unit to control an electronic lock is disclosed in U.S. Pat. No. 7,576,633. In this patent, McGunn et al teaches how to control a safe having an electronic lock, and how to maintain a database of activity related to such an electronic lock.

MOTIVATION FOR THE INVENTION

With retail businesses having several geographic locations, there is a need to widen this network so as to incorporate all the safes in the different places, and also keep accurate accounting records. This substantially increases the amount of currency and the number of locations that have to be monitored. This raises maintenance and development challenges, making the entire network less cost-effective to businesses. More and more businesses are relying on external partners to maintain their networks and servers, so that the business itself may focus on improving its core operations.

The 24-hour cycle of retail businesses, and the plethora of franchises owned by separate parties, adds to the complexity of the monitoring software. Modern businesses also may operate within more than one country. This gives rise to the need for a capacity to handle multiple currencies, in different denominations, operated using multiple languages, and in multiple time zones. Add to that the need for real-time data transport, analysis and accounting, tailored to individual businesses, and we are confronted with a significant computing challenge. Providing such a range of services locally is not optimal, nor is it practical to provide software solutions by periodic, physical, and manual upgrades of the client devices.

Moreover, in maintaining, verifying, and monitoring these large data sets, a considerable amount of storage space is required; a fast LAN/WAN connection is essential; and a central core processor becomes a must. Thus, it is no longer practical to have a local network in a store, with one of the safes controlling that network. At the same time, any remote control of the network will have to be designed in a sufficiently efficient manner to avoid issues of manual system upgrades, storage capacity, processing speed, local network downtime, and server maintenance downtimes. In addition, all proprietary information must be stored away from the local network to avoid system-wide theft.

Thus, there is a great need to improve the prior art to address the needs of modern global businesses. In particular, there is a need for a sophisticated and state-of-the-art true enterprise system that is preferably based on geographically distributed cloud servers, but the cloud of one ore more servers could be housed on the local network. Given the limitations in the prior art outlined above, it becomes important that the safe, which is a client device, is preferably not operated in a stand-alone mode. There is a need to maintain the integrity of cash deposits by remotely controlling the access rules for unlocking of the deposit drawer, and locally requiring an authenticated password to successfully complete such a manual deposit. There is also a need to support multiple currencies and multi-lingual platforms. Moreover, local businesses may retain some control over the particular firmware they wish to install, and this firmware should then be downloaded and installed remotely. Although identification methods would be needed to operate these networks, it is desirable not to store such information on local clients. Apart from digital theft, this also protects loss of data due to malware, system failures, and other mechanical malfunctions. Finally, to maintain the efficiency of all the processes, handle the data and provide real-time feedback, accounting and storage, there is an urgent need to provide a central server(s) that can control an army of clients deployed worldwide.

For the reasons identified above, there is a need in the market for a system wherein a collection of safes can be integrated for the purposes of accounting and business cash management with centralized control, and yet constructed such that each safe itself performs only a limited amount of analytical functioning at the terminal level where security is more likely to be compromised by either a hacker or a dishonest insider.

SUMMARY OF THE INVENTION

In order to achieve the goal of eliminating the security and practical deficiencies noted above, the need exists for a new system for cash depository safe management. According to one aspect of the present invention, the control structure consists of a cloud-based safe regulation system wherein one or more safes are controlled by software resident upon a cloud server or servers for remote hosting. In such a system, each of the plurality of safes is operated independently of each other, with a control relationship directed solely to the cloud-based server system. According to another aspect of such a system, each of the safes would have no means whereby control could be achieved through a sister safe in order to prevent the system from being compromised if any one safe or more is hacked.

According to another aspect of the present invention, a collection of one or more safes is arranged throughout a retail facility with each one including only a limited amount of control software present on the particular terminal. Resident memory on the terminal unit is limited, and processing is limited to a relatively minimal set of well-defined and relatively unsophisticated data management functions. All key control and access parameters are achieved through the central server, which may be a network of servers, i.e. a cloud server.

In a preferred embodiment of the invention, the system is essentially a cloud-based enterprise system, wherein each of a plurality of safes is essentially a client device with all accounting and control functions operated remotely. As such, the safes would be unable to function as stand-alone devices, severed from the control portal. This enables greater security of the overall system by enabling a damaged or compromised unit to be severed from the system without affecting other units.

In other preferred embodiments, both the individual safe units and the server are solid state devices operating through Linux-based control software. Given that the client/safe units have limited individual processing capabilities, the units report real time information to the server. This information includes such parameters as: a) on-board temperature at the safe unit, b) device type and serial number, c) note count—accepted, rejected, stacked, value date and time stamped, d) user information such as logging in times, transaction ID and activity associated with the user, e) alarm information, and f) local area network/wide area network (LAN/WAN) connectivity status. The client/safe requires that a user log in and enter manual deposit information before the manual deposit drawer is unlocked and opened. The system allows for remote authorization and remote removal of identification methods, such as PIB numbers, magnetic cards, I-Keys, proximity cards, and biometric readers.

In some embodiments of the invention, the safes would include user-friendly features including the capability for a local user to access the safe through multiple languages. Such arrangement could accommodate the use by employees of different cultures within a workplace, and enable the safes collectively to be dispersed throughout the World without regard to language translation difficulties. Another user-friendly feature could include a liquid crystal display (LCD) indicator for each cash accepting module that displays the currency accepted and any appropriate error messaging or warnings to the user. In addition, a slide out tray can accommodate easy maintenance and cleaning of the cash accepting modules.

In some embodiments, interior lighting is installed in the safes in order to accommodate use of the unit at night or in areas of low ambient lighting. In such embodiments, the lighting can be triggered for operation by the opening of the door, using a spring-loaded depression switch or the like.

In yet another embodiment, the graphical user interface present at the client/safe unit could also be used as a communication portal to transmit messaging from the server. This could include delivery of general notices or advertising to the employees or other users in a company.

The embodiments of the present invention significantly improve the system over disadvantages existing in the prior art. It provides a true Enterprise system wherein a safe is a client device, and may preferably not operate in stand-alone mode. The system itself is local or cloud server based. Both the clients and servers are solid state central processing unit (CPU) based and run proprietary software. Each client has at least one cash accepting module which can accept multiple currencies. The system itself is multi-lingual. Authentication is performed remotely by accessing the server, and this secure information is not stored locally. System upgrades and routine maintenance are also performed by remote downloads of firmware. These and other novel features of this invention are described in the detailed specifications.

DESCRIPTION OF EMBODIMENTS

Figure 1:
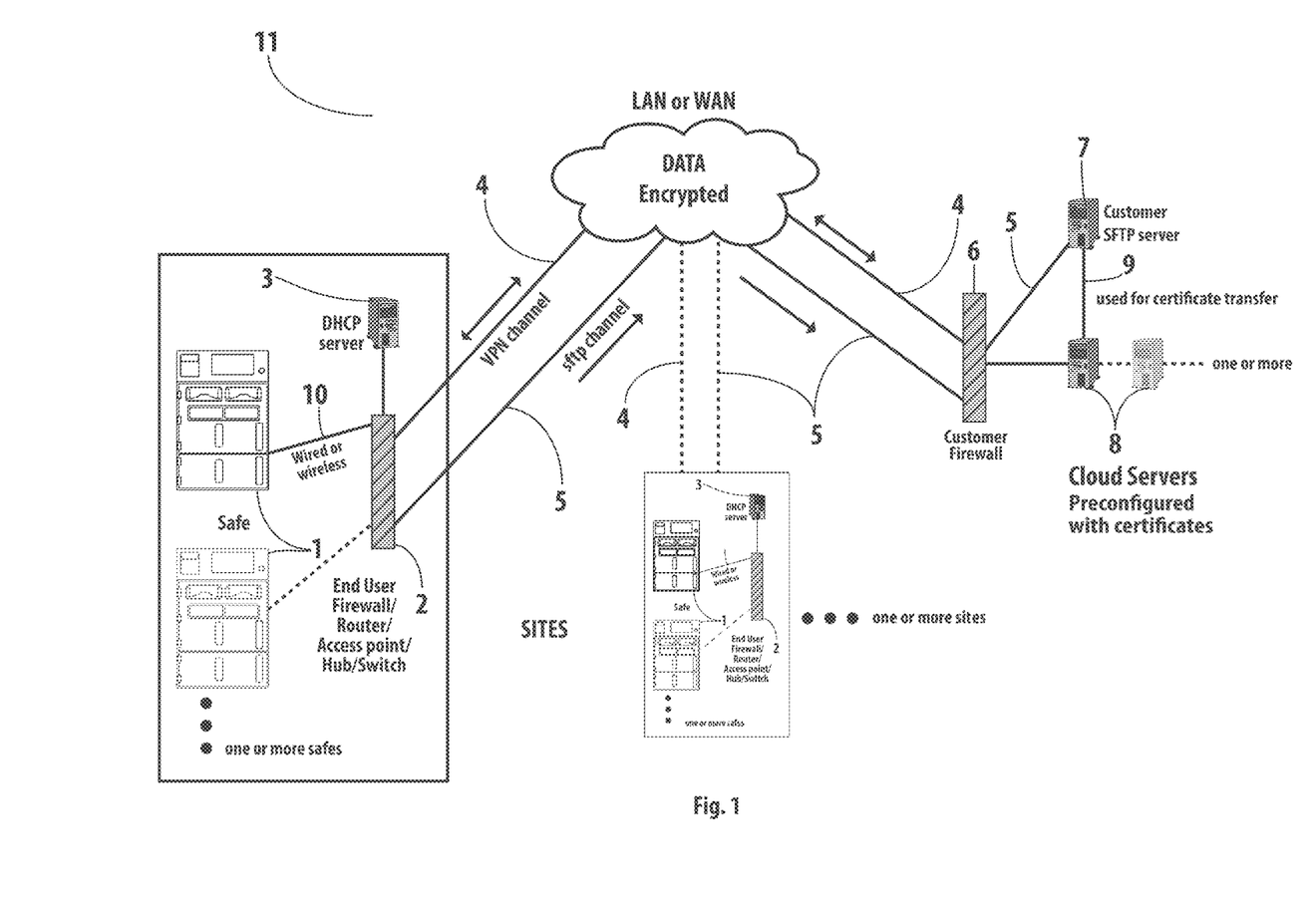
FIG. 1 is a schematic of an embodiment of the remotely operated cash management system of the present invention.

Referring now to FIG. 1, an embodiment of a cloud-based cash management system 11, may be seen. In the embodiment of FIG. 1, cash management safes 1 are networked to a remote cloud-based server 8, which may be a network of multiple physical servers. The cash management safes 1 connect to either a local firewall or router 2 using either a conventional Ethernet cable 10 or a wireless link to a wireless network router or access point 2. In the case of a LAN deployment, device 2 may be an Ethernet hub or switch.

Upon power up, the cash management safe 1 communicates with an on-site dynamic host configuration protocol (DHCP) server 3 to obtain an Internet Protocol (IP) address and Internet access. In some configurations, the function of device 3 may be performed by device 2. Optionally, cash management safe 1 can be programmed with a static IP address eliminating the need for device 3.

The cash management safe 1 establishes a high security encrypted virtual private network (VPN) channel 4 over either a WAN or a LAN to a cloud server 8 by using a high security encryption algorithm. An example of one suitable, commercially available high-security encryption algorithm is Blowfish™. Cash management safe 1 automatically polls through cloud servers 8 until it can establish a secure connection. The cash management safe 1 is authenticated by a pre-installed electronic certificate that uniquely identifies it to the cloud servers 8.

Prior to installation of a cash management safe 1, if the optional interface to a customer server exists, then customer's server 7 would generate or be provisioned with some combination of electronic certificates, login ids, and/or passwords that allow remote access to the customer server 7 by cash management safe 1. This authentication data would be transferred to the cloud servers 8 over network connection 9. The connection between the cash management safe 1 and customer server 7 is shown by 5 and uses an encrypted Internet protocol that may include, but not be limited to, secure file transfer protocol (sftp).

Upon initial installation at an end user site, the cash management safe 1 would create the VPN channel 4 to a cloud server 8 as described herein. The cash management safe 1 would then download from a cloud server 8 some or all of the following information: Site information, configuration information, language, currency configuration, user list, user passwords, user authentication rules, manual drop types, EOD type, lock time delay configuration, transactions codes, user access rules, software imposed limits on currency cassette capacity, user role definitions, alert configuration, alert e-mail notification list, departments, and shift configuration. If the optional interface to a customer server 7 is present, then any necessary electronic certificates, logins, passwords, or other access information would be sent from the cloud server 8 to the cash management safe 1, as well.

Figure 2:
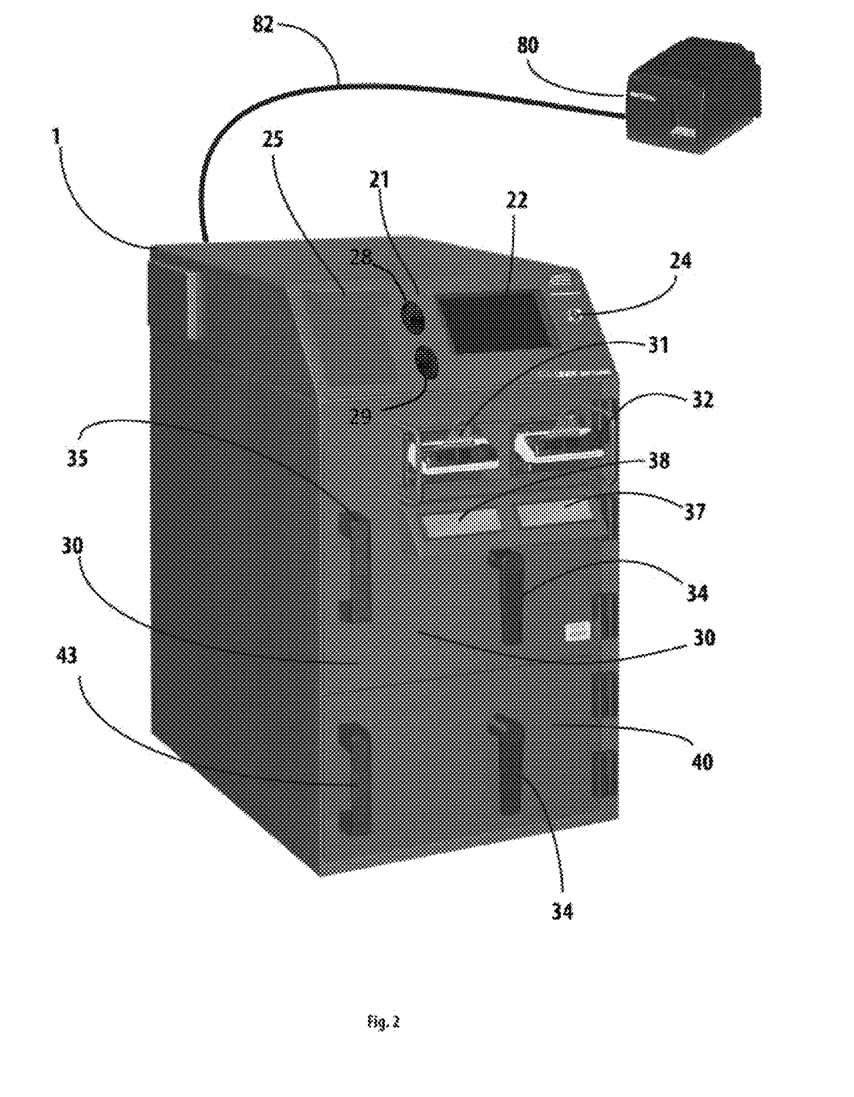
FIG. 2 is a perspective view an embodiment of a cash management safe.

Referring now to FIG. 2, several external features of cash management safe 1 are visible. Safe 1 employs several hardware elements that may securely and intelligently receive cash, coin, checks, and other financial instruments and may dispense cash and coin as well. These hardware elements may interface with a cloud server 8 via a solid state CPU internal to cash management safe 1 and in some cases have their on-board operating instructions updated by cloud server 8. In the embodiment shown in FIG. 2, cash management safe 1 has an upper panel 21 and two lower doors, automated exchange door 30 and manual storage door 40.

Figure 3:
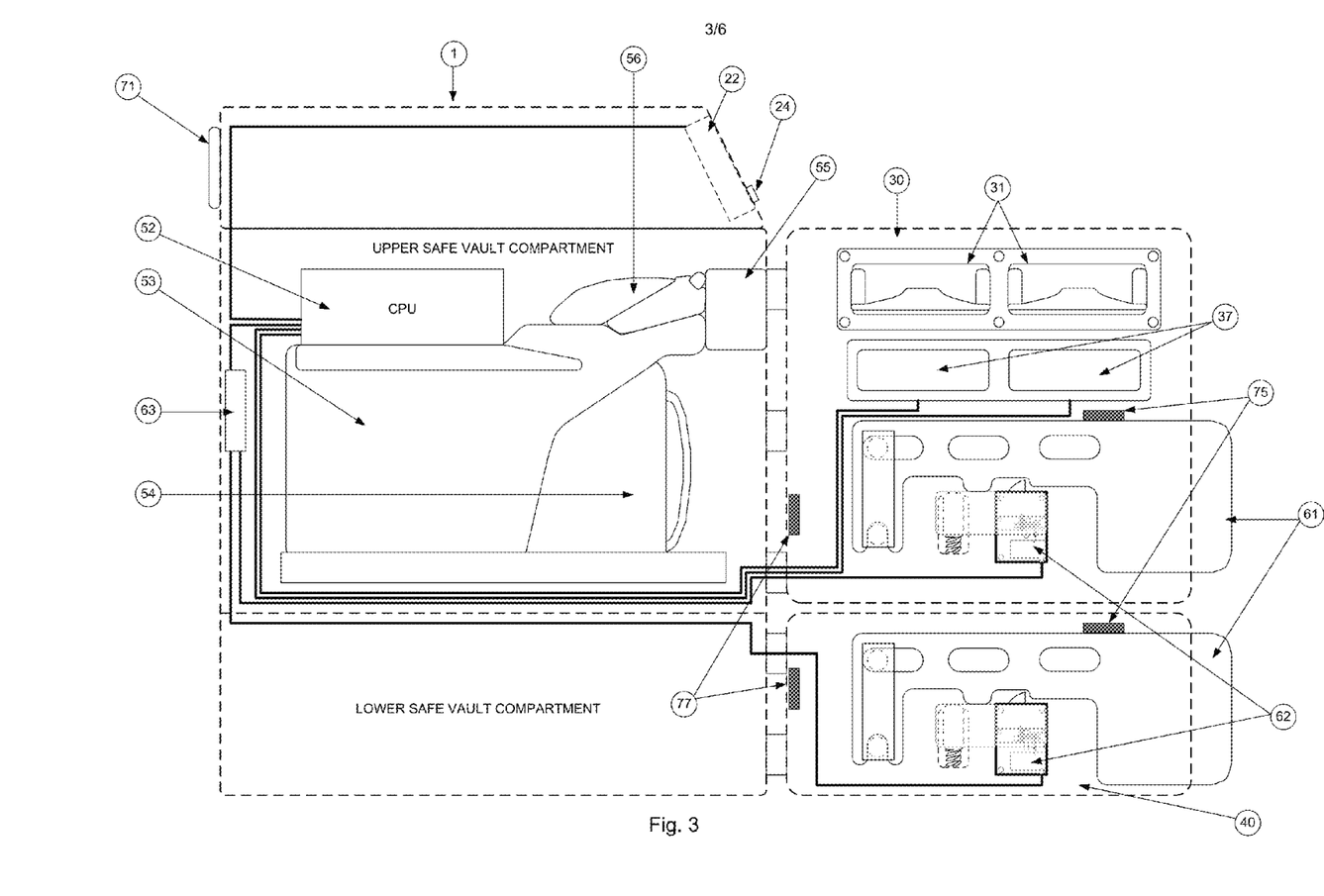
FIG. 3 is a side sectional view of the body of a cash management safe and a rear view of the safe door to show the internal components of one embodiment of a cash management safe.

Referring now to FIG. 3, internal to cash management safe 1 is CPU tray 52, a chassis for the cash collector 53, a cash collection bin such as a cassette 54, an optional bulk note feeder 55, a bill validator 56, and a USB switch module 63. An upper vault door 30 contains LCD cash processing screens 37. Also on upper vault door 30 is a locking slide bar 61, a bolt location sensor 75, and intelligent USB session initiation protocol (SIP) lock mechanism 62. A lower vault door 40 also contains a locking slide bar 61, and a bolt location sensor 75, and intelligent USB SIP lock mechanism 62.

Figure 4:
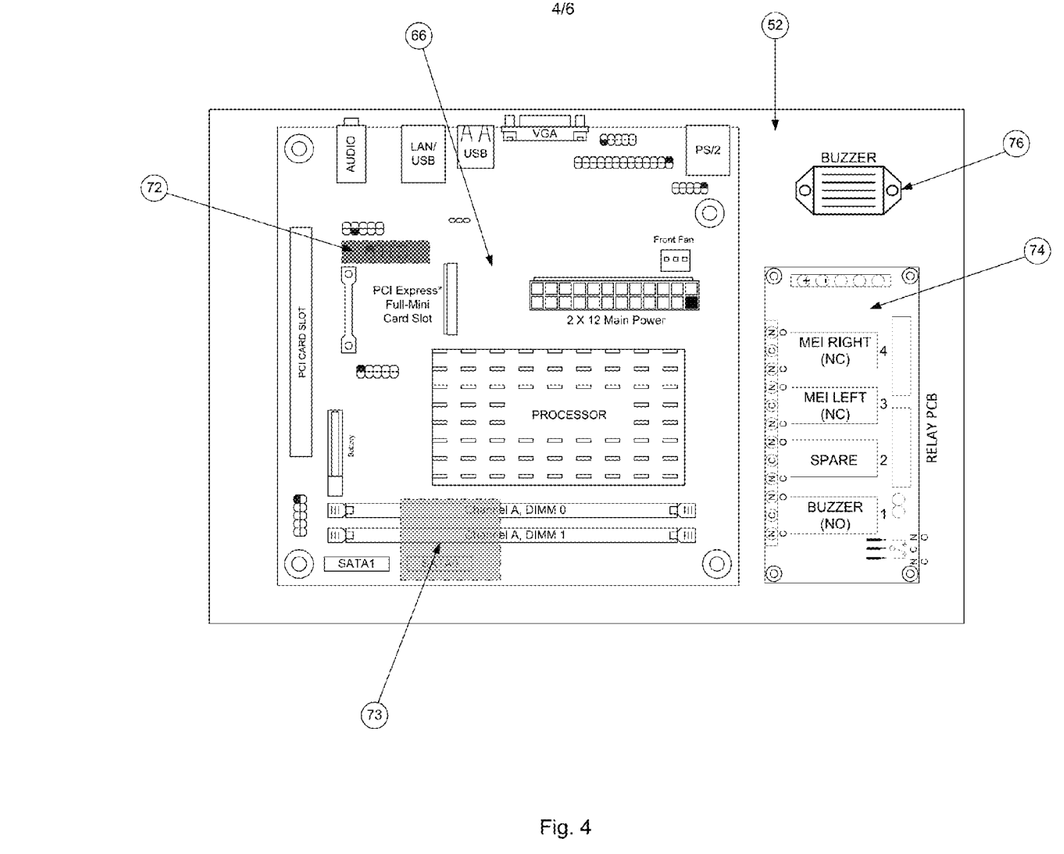
FIG. 4 is a sample diagram of the CPU tray represented by item 52 in the embodiment shown in FIG. 3.

Referring now to FIG. 4, this figure shows a detailed view of an embodiment of CPU tray 52. CPU tray 52 contains a fanless CPU board 66 which may contain interfaces for Ethernet, USB, RS-232 Serial, Parallel, VGA Video and Audio, where the interface supports both input and output audio. CPU board 66 also supports RAM memory slots, serial advanced technology attachment (SATA) disk channels, and expansion slots (such as peripheral component interconnect (PCI) or PCI Express). The embedded operating system, firewall capability, and other proprietary software are contained on a solid state flash memory chip 73 attached to a SATA port. An encrypted USB flash memory chip 72 contains the proprietary application and local data cache. A 4 channel relay board 74 is controlled by CPU board 66. The power for each cash acceptor 31 is routed through a relay channel on board 74 as well as power to an internal buzzer 76.

All proprietary software running on the cash management safe 1 is stored in encrypted flash memory chip 72. To access flash memory chip 72, an access code is required. The software program displays a touch screen 22 upon boot up that contains a challenge code and a phone number to call. The system operator then calls the phone number to reach a call center and provides the challenge key to the call center. The call center then enters the challenge key in a secure area of the cloud server's 8 web service software and a response key is generated and provided to the system operator. The system operator enters this key using touch screen 22. If the response key is correct for the challenge code entered, then access to the encrypted file system is achieved. If not, then the response code can be re-entered up to a fixed number of times (as configured in the web services) before a new challenge code is issued.

Routing the power for each cash acceptor 31 through a relay channel on board 74 provides at least one advantage for maintaining operation of cash acceptors 31. To clear jam conditions in a cash acceptor, it is sometimes necessary to recycle power to the cash acceptor. Typically, in prior art cash management systems, this would require a recycle of power to the entire safe since the cash acceptor is embedded in the safe. However, various embodiments of cash management safe 1 provide a relay circuit to the power supply of cash acceptors 31 that the software can trigger to recycle power only to the individual acceptor 31.

Figure 5:
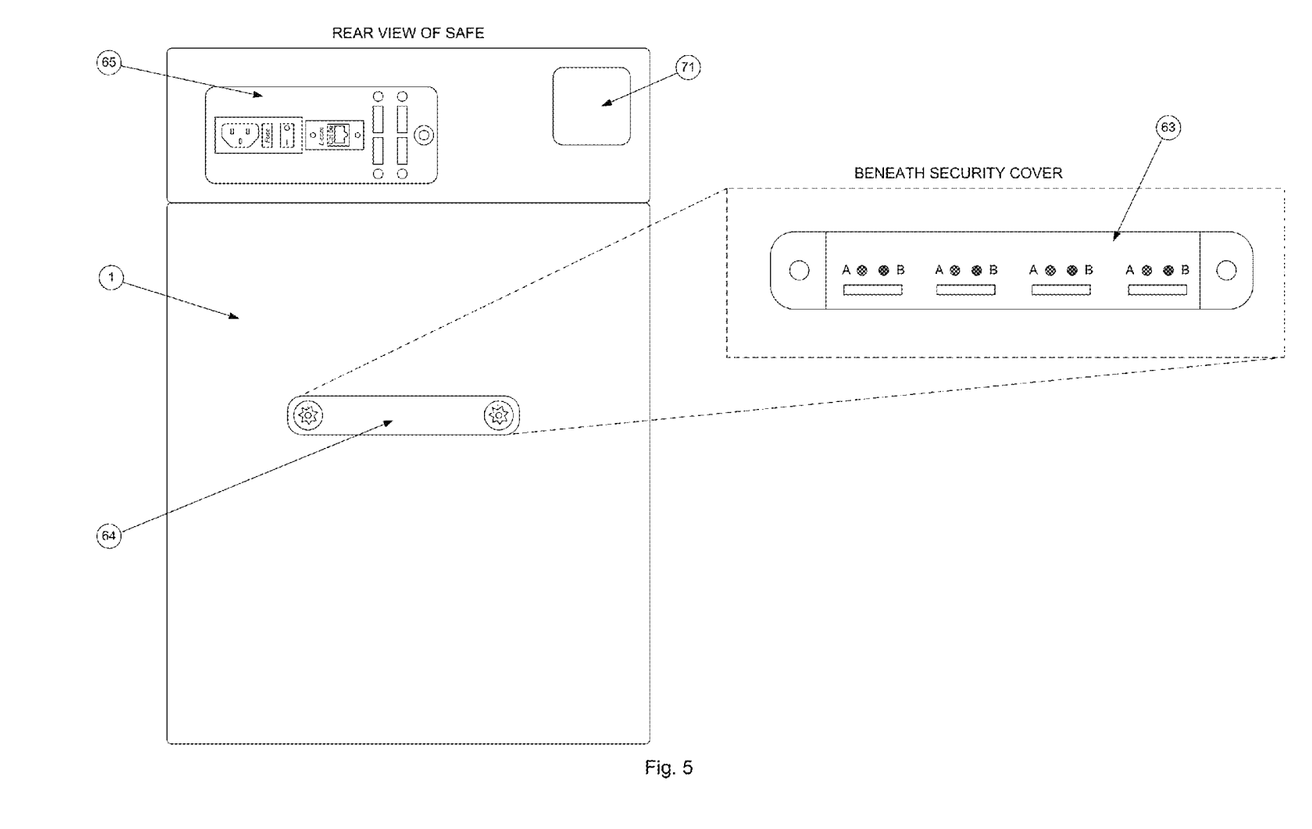
FIG. 5 is a rear schematic view of an embodiment of a cash management safe.
Figure 6:
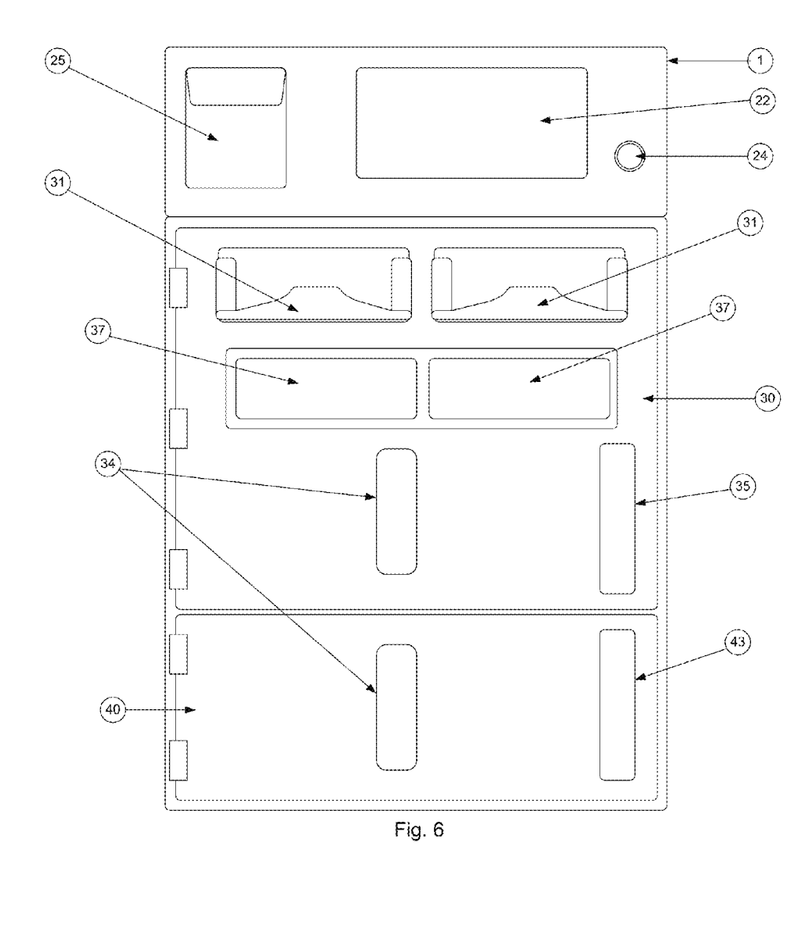
FIG. 6 is a front view of an embodiment of a cash management safe.

Referring now to FIG. 5, this figure shows the rear of cash management safe 1. Contained on the rear of cash management safe 1 is an external interface panel 65 which contains connectors for power, network, sensor output, USB, and a power switch. A seismic sensor 71 may be optionally attached to the back of the safe. A cover plate 64 attached with security screws conceals access to the USB switch 63 and the USB cables from the internal SIP locks 62 which attach to it.

SIP locks 62 (as shown in FIG. 3) in cash management safe 1 contain their own microprocessor. The lock circuitry is powered solely by USB power. In the event of any type of hardware failure in the cash management safe 1, including complete loss of power or shorting of power circuitry, removal of cover plate 64 allows the attachment of a Field Service Unit (FSU) directly to the USB interface of the lock 62. The FSU would then power the lock 62, and using a proprietary software module, with the appropriate challenge key and response code, lock 62 may be unlocked.

Returning to FIG. 2, upper panel 21 houses touch screen 22. Touch screen 22 is capable of changing its display and CPU 66 drives those changes interactively based on inputs from a user. Touch screen 22 can display prompts, menus, alphanumeric pads, instructions, and other messages. A user can make selections or enter data on touch screen 22 and CPU 66 responds to inputs to touch screen 22 by the user. These responses may include instructions to other elements as well as changes to the display of touch screen 22. In addition to operational information, the touch screen 22 may display information specific to a user, and in some cases may display advertising style information. In particular, during idle times, touch screen 22 may display advertising using a screen saver style display.

Still referring to FIG. 2, in the embodiment shown, automated exchange door 30 has at least one bill handler 31. Depending on the particular application or embodiments, bill handlers 31 may be configured to be currency validators. Currency validators are capable of accepting currency and validating the denomination of a bill as it is accepted. Some embodiments of the cash management safe may have a first bill handler 31 configured to accept and validate bills from one or more national currencies, while having the other handler(s) 31 configured to accept and validate bills from different national currencies. When bill handlers 31 are currency validators, they may have their on-board programming, or firmware, modified by cloud server 8. The modification of the firmware may be to allow a validator to validate newly issued bills of a currency, or validate bills of a different currency or combination of currencies. In some embodiments of cash management safe 1, one of bill handlers 31 may be a bill dispenser, dispensing currency as instructed by CPU 66.

Referring now to both FIGS. 2 and 3, automated exchange door 30 may be opened for service such as to remove deposited currency or to maintain and service bill handlers 31. Automated exchange door 30 is held shut by a locking bolt or plate 61. Lock handle 34 must be turned to withdraw the locking bolt or plate 61 and it is controlled by intelligent SIP locking mechanism 62. Pull handle 35 on automated exchange door 30 facilitates opening and closing automated exchange door 30. Bolt position sensor 75 signals CPU 66 when door 30 changes state between bolted and unbolted. CPU 66 monitors sensors 75 and 77, and provides a user feedback regarding the door locking bar position, both open and closed, via touch screen 22.

Manual storage door 40 has many similarities with automated exchange door 30. It is held closed by a locking bolt or plate 61 that may be moved by lock handle 34 and is controlled by the intelligent SIP locking mechanism 62. Bolt position sensor 75 signals CPU 66 when door 40 changes state. Manual deposit drawer 25 provides for a means of depositing envelopes with bills, checks, or other items. The user, having logged onto cash management safe 1 and progressed to the appropriate display on touch screen 22, enters the amounts of currency in the manual drop packet into the system via touch screen 22. CPU 66 records the amount, and in some embodiments, generates a receipt on printer 80 at cash management safe 1. Other embodiments may generate a receipt at a nearby supporting printer.

Both automated exchange door 30 and manual storage door 40 enclose secure interiors. Each is fixed with sensors 77 to confirm their closure. CPU 66 records when the doors are opened and by what user as entered at touch screen 22 and external ID sensor 24. In some embodiments, the secure interiors of safe 1 are provided with lighting. Between providing secure space for deposited currency and the inner working elements of safe 1, space within safe 1 is limited and when service is being performed in the interior, light can be restricted. CPU 66, once it validates a user's authority to open door 30 or 40, can also turn on interior lights to facilitate the activity being undertaken, i.e. retrieving deposits, servicing electrical and mechanical elements, etc.

As alluded to above, several of the elements in cash management safe 1 have on-board programmable, or reprogrammable, memory. Cloud Server 8, through its connection to the safes, can re-program and update the instructions on flash memory devices 72 and 73. This provides the ability to globally update a system of several disparately located safes from a single remote location nearly simultaneously. Alternatively, a system of safes wherein the safes are acquired and installed over time may have variations among the models of individual elements. In that case, the cloud based server 8 can maintain a table, or index, of the component parts in each safe and updated the firmware appropriately for the particular element model. In addition to maintaining model and component information, the software on cloud server 8 has the capability of determining the safe's exact location through an uploaded photograph of the site (taken during either the site survey or installation process) if the photograph contains the EXIF GPS tags as added by most newer cameras and PDA's.

CPU 66 receives all signals generated by on-board sensors as well as information input by users interfacing with the safes. Logic programmed into CPU 66 can interpret these signals from on-board sensors to determine the status of cash management safe 1. For example, CPU 66 may determine an alarm condition for cash management safe 1 based on certain signals, or combination of signals. A signal from seismic sensor 71 may be interpreted as an indication that cash management safe 1 is being moved without authorization and CPU 66 would then determine an alarm condition for cash management safe 1. Combinations of signals from sensors 77 and bolt position sensors 75 could be result in the determination of an alarm condition. Additionally, user could input a distress code at touch screen 22 or other input interfaces. With the input of the distress code, CPU 66 would determine an alarm condition exists.

Once an alarm condition is determined, the software in CPU 66 is capable of generating action. The particular action may depend on the origin of the alarm condition. Internal buzzer 76 on board 74 or other sound generating apparatuses may be used to generate an audible alarm. The software in CPU 66 is also has a control point in it which allows a call to an external application interfaced with an alarm panel external to cash management safe 1. This would be used to automatically trigger an alarm in a duress situation.

Some situations do not require an alarm per se, but still require action be taken, or that a person be informed of the situation. In these situations, e-mail alerts, based on rules set up on the cloud server 8 and sometimes information provided by cash management safe 1, are sent to lists of e-mail addresses maintained on the cloud server 8. The software has alert points where the delivery of an immediate notification of an event or condition is desirable. The software allows these events to be classified into categories. Each category of alerts is associated with a list of e-mail addresses that is setup and maintained through the web services running on the cloud servers 8. Of course, one category could include the alarm condition discussed above.

As discussed above with respect to CPU 66 in FIG. 4, CPU 66 can support types of inputs and outputs beyond touch screen 22. Speaker 28 and microphone 29 on upper panel 21 are supported by the audio port on CPU 66. The software in CPU 66 has the necessary modules to support the capture and storage of video from any video camera with a standard USB interface via the video port on CPU 66. The audio capabilities provide an additional medium of communication, while the video capabilities support a common security tool of onsite video.

In addition to supporting audio and video, CPU 66 supports communication with external devices to acquire enterprise information. The proprietary application software running on cash management safe 1 has a control point that allows input of data from external systems such as Point of Sale (POS) systems. This transaction data is reported by the cash management safe 1 to the cloud servers 8, where it is stored.

Referring now to FIG. 2, receipt printer 80 is connected to cash management safe 1 by standard communication line 82. Receipt printer 80 provides paper receipts for deposits into safe 1 and provides totals for withdrawals when safe 1 is being serviced and deposits withdrawn. Other printers may be connected to safe 1 to receive more extensive reports generated by cloud server 8 or due to the networked nature of the system, cloud server 8 can direct reports to any printer networked into the system.

Depending on its configuration, ID sensor 24 can register an iButton, RFID device, or a biometric characteristic such as a finger print. iButtons contain a chip with stored information and have contacts for communication with other devices. With respect to the iButton, ID sensor 24 would have complimentary contacts matching those of the iButton to correlate an identification with the entered PIN. With respect to the RFID device, ID sensor 24 would have an electromagnetic reader wirelessly communicating with the RFID device. With respect to the biometric feature, an optical, infrared, or other type of scanner would capture the biometric characteristic. In each of these cases, ID sensor 24 would relay its received information back to CPU 66 and CPU 66 would perform the comparison to database information which confirm or deny an entered PIN.

The embodiment of safe 1 of FIG. 2 has automated exchange door 30 and manual storage door 40, and their release is controlled by entry of a PIN into touch screen 22 and the confirmation security device such as an iButton etc. In the embodiment of FIG. 2, safe 1 has LCD screens 37 associated with their respective bill handlers 31. LCD(s) 37 display the currencies supported by their corresponding bill handler(s) 31, respectively. Automated exchange door 30 has bill handler(s) 31 and manual storage door 40. Manual drop drawer 25, located in upper panel 21, provides access to drop envelopes and other articles. Manual drop 25 is secure and prevents vandalism to prior dropped packages or to the interior of safe 1, as well as discouraging attempts to extract articles. Manual exchange door 30 provides access for retrieval of items deposited via manual drop drawer 25.

While a local data cache of all information known to CPU 66 is stored on the encrypted flash memory chip 72, CPU 66 continually updates a cloud server 8 with this information at programmed intervals. This information may include, but is not limited to: system health data (temperature sensors, voltages), estimated printer head lifetime, local date and time, uptime, print count, printer status, note count (lifetime, current, and value), percent of cash capacity, number of notes and value thereof accepted, model of cash acceptor head, serial number of cash acceptor head, complete cash acceptor status data, all transaction logs, shift information, cash accounting, alerts, errors, cash cassette ids, login history, current software version, network information, backup up power supply (UPS) status, and lock time delay information. Upon startup of safe 1, CPU 66 may also transmit cash acceptor firmware version to cloud server 8. In the event of a network outage, all of this information is kept in the local data cache 72 and all historical information is automatically transferred to cloud server 8 upon restoration of the network.

The cloud servers 8 are implemented that in the case that more than one server exists in the cloud, it is an identical replication of all other servers in the cloud. All data between the servers is kept is automatically continuously synchronized. This means that safe 1 can connect to any available cloud server 8 and reporting done from any cloud server 8 will contain up to date information from safe 1. Cloud server 8 is intended to be managed and configured either locally or remotely using secure and encrypted web services running on cloud server(s) 8. These web services are compatible with PDA devices such as smart phones and tablet PCs as well as desktop workstations.

The embodiments and claims disclosed herein are further capable of other embodiments and of being practiced and carried out in various ways, including various combinations and sub-combinations of the features described above but that may not have been explicitly disclosed in specific combinations and sub-combinations. Accordingly, those skilled in the art will appreciate that the conception upon which the embodiments and claims are based may be readily utilized as a basis for the design of other structures, methods, and systems. In addition, it is to be understood that the phraseology and terminology employed herein are for the purposes of description and should not be regarded as limiting the claims.

Furthermore, the Abstract is neither intended to define the claims of the application, nor is it intended to be limiting to the scope of the claims in any way. It is intended that the application is defined by the claimed appended hereto.

We claim:

1. A safe management and transaction tracking system, comprising:
    a safe enclosing a first secure interior, said safe comprising,
        a solid state central processing unit,
        a currency validating apparatus having a microprocessor in communication with said central processing unit,
        a first door allowing access to said first secure interior, said first door secured by a first electronic lock in communication with said central processing unit, and
        a first external communication port associated with said central processing unit;
    a network, said network comprising,
        a solid state server,
        a work station and,
        a first communication link between said work station and said solid state server;
    a second communication link between said first external communication port of said safe and said network;
    wherein said currency validating apparatus is programmable via said network to accept a variety of currency sets; and
    a dedicated relay circuit for each said currency validating apparatus, said central processing unit capable of resetting each said relay circuit independently.

2. The safe management and transaction tracking system of claim 1, wherein; said central processing unit is programmable via said network to alter a display of a touch screen to display in a variety of languages.

3. The safe management and transaction tracking system of claim 1, further comprising; a plurality of solid state servers interlinked with each other within said network.

4. The safe management and transaction tracking system of claim 1, comprising; a plurality of said safes, each said safe having a communications link with said network.

5. The safe management and transaction tracking system of claim 1, wherein; said safe comprises a plurality of said currency validating apparatuses.

6. The safe management and transaction tracking system of claim 1, wherein; said communications link between said safe and said network is a wireless communication link.

7. The safe management and transaction tracking system of claim 1, further comprising; sensors monitoring said first electronic lock, said sensors communicating with said central processing unit.

8. The safe management and transaction tracking system of claim 1, further comprising; a second external communication port associated with said central processing unit; a printer associated with said safe; and, a communication link between said second external communication port and said printer.

9. The safe management and transaction tracking system of claim 1, further comprising; an ID sensor associated with said safe to effect secure login of a user.

10. The safe management and transaction tracking system of claim 9, wherein; said ID sensor is an optical scanner for scanning biometric characteristics of a user.

11. The safe management and transaction tracking system of claim 9, wherein; said ID sensor reads a hardware device assigned to a user.

12. The safe management and transaction tracking system of claim 1, wherein; said safe encloses a second secure interior, said safe further comprising a second door allowing access to said first secure interior, said second door secured by a second electronic lock in communication with said central processing unit.

13. The safe management and transaction tracking system of claim 1, wherein; said safe further comprises an external USB port and said first electronic lock can be operated via said external USB port.

14. The safe management and transaction tracking system of claim 1, wherein; said safe further comprises a speaker and a microphone, and said central processing unit supports audio input and output via said microphone and said speaker.

15. The safe management and transaction tracking system of claim 1, wherein; said central processing unit operates on a proprietary operating system not based on commercially available computer operating systems.

16. The safe management and transaction tracking system of claim 1, wherein; said central processing unit is programmed to provide firewall functions for said safe.

17. The safe management and transaction tracking system of claim 1, wherein; said central processing unit monitors signals from onboard sensors and analyzes said signals for alarm conditions and when an alarm condition is determined contacts and external alarm device.

18. The safe management and transaction tracking system of claim 1, wherein; said server maintains a table of e-mail addresses, and said safe transmits onboard sensor data through said network to said server, and said server sends e-mail alerts based on rules programmed in said server.

19. The safe management and transaction tracking system of claim 1, further comprising; a USB port for exchanging information with a point-of-sale station, said central processing unit communicating information from said point-of-sale station to said server.

* * * * *